United States Patent Office.

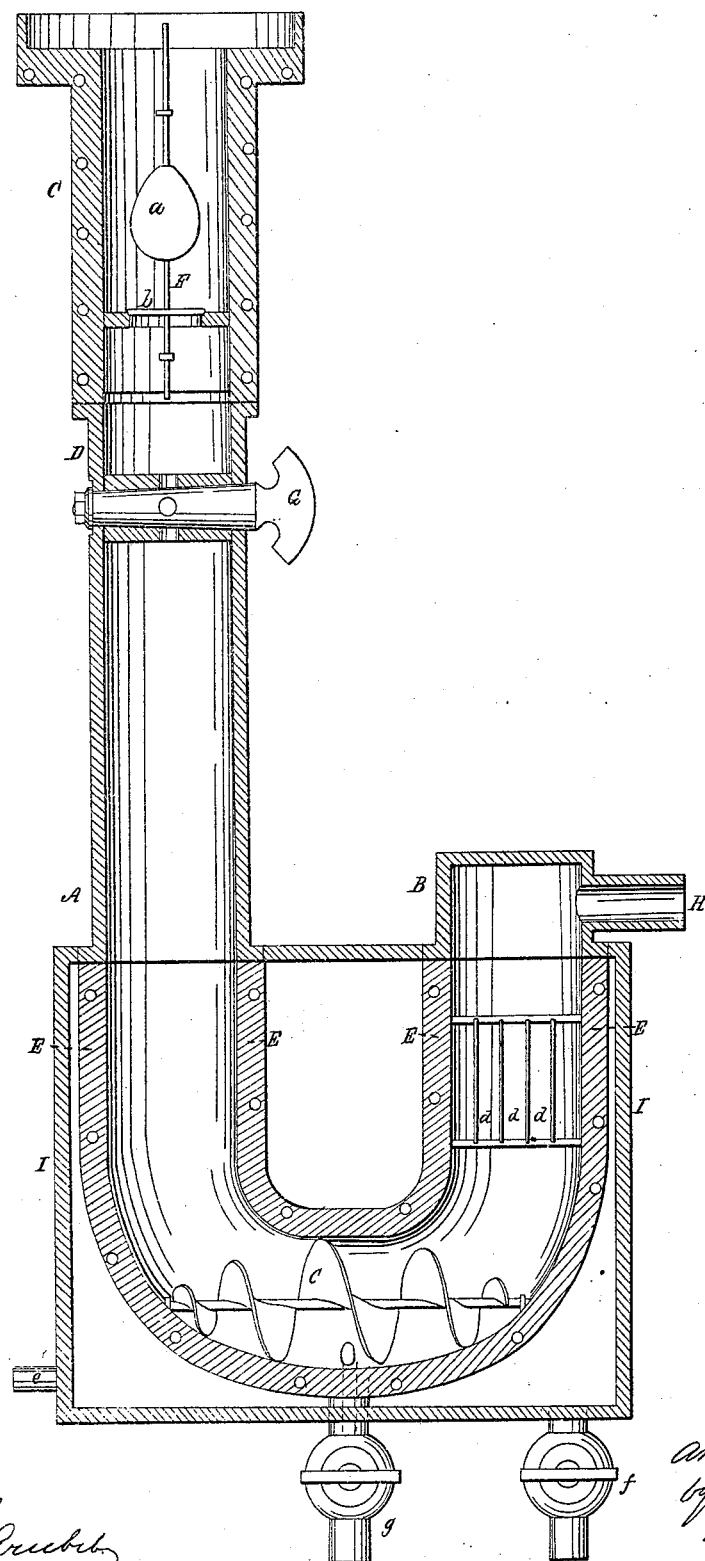

ARTHUR SWAZEY, OF CHICAGO, ILLINOIS.

Letters Patent No. 70,646, dated November 5, 1867.

---

IMPROVED AMALGAMATOR.

---

The Schedule referred to in these Letters Patent and making part of the same.

---

TO ALL WHOM IT MAY CONCERN:

Be it known that I, ARTHUR SWAZEY, of Chicago, in the county of Cook, and State of Illinois, have invented certain new and useful Improvements in Amalgamators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to amalgamators, and consists of new and important improvements in the method of separating gold and silver from their ores, by mixing them with mercury. The drawing—

Figure 1, represents a vertical sectional view of my amalgamator, and shows all of its working parts.

The process of separating gold and silver from their ores by the use of mercury has been long known. The principal difficulty has been to make an amalgamator that would be sufficiently simple, cheap, and convenient for the purpose, and at the same time effective in producing the desired results. In my amalgamator I think this end has been attained. In constructing it, I make a siphon-shaped tube, having its arms, A B, of different lengths, and consisting of sections C, D, and E, as shown in the drawing. The ends of the sections C, D, and E, I provide with flanges, by which they may be fastened together with screws or bolts; and the sections C and E, I make of two parts, dividing them longitudinally, and which I also fasten by means of screws or bolts. By thus constructing the tube of parts, I can at any time have convenient access to its interior. In section C, I place a buoyant valve, F, provided with a buoy, $a$, and a stop, $b$, and in the bend of the tube a self-acting spiral, $c$, to prevent clogging, having its middle portion sufficiently large to extend across the tube. In the short arm B of the tube I place vertically a series of movable plates of silvered copper, $d$, and in the upper end, or near it, and below the buoyant valve F, a stop-cock or check, G. The upper end of the long arm of the tube is open, while the upper end of the short arm is closed, but provided with a waste pipe, H. Around the bent portion of the tube, or that part embraced by section E, I place a steam-jacket, I, having a pipe, $e$, for the introduction of the steam, and a waste-cock, $f$, for the escape of the steam when desired, and also a waste-cock, $g$, passing through it into the tube, as shown in the drawing. One side of the steam-jacket I, I make so that it may be removed when access is desired to section E of the tube.

In operating my amalgamator, I place it in a vertical position, and then introduce sufficient mercury into the tube to completely fill the bend, as shown by the dotted lines in the drawing. I then introduce the ground quartz or ore, or sand and dirt mixed with water, into the upper end of the long arm A of the tube. The buoyant valve F is raised by the buoy $a$, and the liquid mass passes down through the stop-cock G, turned for the purpose, and fills the long arm, and presses against the mercury in the bend of the tube. At first the mercury is pressed forward or lifted, but falls back again by reason of its greater specific gravity. The weight of the lighter liquid in the long arm A of the tube forces it through the mercury, causing the spiral $c$ to revolve, and thus keep the mercury in constant agitation. After the lighter liquid is thus forced through the mercury, the pressure continuing, it passes up the short arm B, between the vertical silvered plates $d$, and out through the waste-cock H. When it is desired to have the flow of the lighter liquid uninterrupted, the buoyant valve F may be fastened up, or, when it is desired to stop it entirely, the check-cock G can be turned. While this is going on, I introduce steam into the steam-jacket I through the pipe $e$, which heats the mercury, rendering it more liquid, and, with the movement of the lighter liquid and the spiral $c$, kept in constant agitation. During this process the gold or silver will amalgamate with the mercury in the bend of the tube, and whatever particles may escape or fail to be taken up will amalgamate with the silver on the silvered plates $d$. After the amalgamator has run for a sufficient length of time, I shut off the steam from the steam-jacket, and allow that in the jacket to escape through the waste-cock $f$, then draw off the liquid through the cock $g$. After this is done, the side of the jacket and of the section E of the tube may be taken off, and the silvered plates $d$ may be removed, and the gold or silver be separated from the mercury by any of the usual processes. In this way a larger percentage, I believe, of gold and silver can be obtained from their ores than by any of the processes now in use.

Having thus described my invention, what I claim is—

1. Providing the long arm A with the buoyant valve F and stop-cock G, arranged to operate as described, and for the purposes set forth.

2. The movable plates $d$, when arranged to operate substantially as described, and for the purposes set forth.

3. The spiral $c$, when arranged to operate automatically by the movement of the liquid, substantially as described, and for the purpose set forth.

4. The construction of the tube in sections, so that portions of the same may be removed, as described, and for the purposes set forth.

5. An inverted siphon-shaped tubular amalgamator, of movable sections, with a buoyant valve, F, stop-cock G, movable plates $d$, and self-acting spiral $c$, when arranged to operate within the tube as described, and with its bent portion surrounded with a steam-jacket, I, for the purposes set forth.

ARTHUR SWAZEY.

Witnesses:
GEO. P. TYLER,
EDW. SWAZEY.